United States Patent

[11] 3,625,864

| | | |
|---|---|---|
| [72] | Inventor | Bertalan Horvath<br>Southern London, England |
| [21] | Appl. No. | 818,803 |
| [22] | Filed | Apr. 23, 1969 |
| [45] | Patented | Dec. 7, 1971 |
| [73] | Assignee | Phillips Petroleum Company |

[54] POLYMERIZATION CATALYST SYSTEM ADDITIVES
10 Claims, No Drawings

[52] U.S. Cl. .................................................. 252/430, 260/94.9 D
[51] Int. Cl. ...................................................... C08d 3/04
[50] Field of Search .......................................... 252/430; 260/94.9 D

[56] References Cited
UNITED STATES PATENTS

| | | | |
|---|---|---|---|
| 2,898,326 | 8/1959 | Peters et al. ............. | 260/94.9 D X |
| 3,365,439 | 1/1968 | Bjornson .................. | 260/94.9 D |
| 3,445,367 | 5/1969 | Kallenbach .............. | 260/94.9 D |

*Primary Examiner*—Patrick P. Garvin
*Attorney*—Young and Quigg

ABSTRACT: A method of preparing a polymerization catalyst which involves impregnating a catalyst support with chromium oxide and a titanium complex formed by reacting a titanium alkoxide a compound selected from the group consisting of $R'_x Sn(OH)_m$ and $R''_p B(OH)_q$ in which $R'$ and $R''$ are selected from the group consisting of alkyl, aryl, and cycloalkyl radicals and combinations thereof.

POLYMERIZATION CATALYST SYSTEM ADDITIVES

This invention pertains to polymerization catalyst system additives.

In one of its more specific aspects, this invention pertains to the addition of perturbing agents to conventional olefin polymerization catalyst systems to affect the product of the polymerization process.

Processes for the polymerization of olefins are well known. Generally, such processes concern polymerization of at least one aliphatic 1-olefin having from two to eight carbon atoms per molecule at a polymerization temperature range of 150° to about 450° F. with a catalyst, frequently chromium oxide, supported on at least one support component such an silica, alumina, zirconia and thoria. Generally, a portion of the chromium is in hexavalent state at the initial contact between the olefin to be polymerized and the catalyst.

It is known that certain compounds can be added to the catalyst system to affect, or perturb, the reaction. Generally, such perturbing agents are directed towards producing a polymer product having an altered melt index in comparison to that obtained in the absence of the use of the perturbing agent, that is, in the presence of only a conventional catalyst system.

This invention provides such a method for preparing a perturbed catalyst system. According to the method of this invention, there is provided a process for preparing an olefin polymerization catalyst which comprises reacting a titanium alkoxide of the general formula $Ti(OR)_4$ with a compound selected from the group consisting of $R'_x Sn(OH)_m$ and $R''_p B(OH)_q$ to form a titanium complex; $m$ and $n$ are integers as are $p$ and $q$; $m$ will have a value of 1 to 3, inclusive, the sum of $m$ and $x$ being 4, the valence of the tin ion; $q$ will have a value of 1 to 2, inclusive, the sum of $p$ and $q$ being 3, the valence of the boron ion. The complexes so formed used to impregnate the catalyst support which will be silica, alumina, zirconia and thoria, and the impregnated support will have deposited on it the chromium oxide, thus forming an olefin polymerization catalyst.

Accordingly, it is an object of this invention to provide a new catalyst system additive.

It is another object of this invention to provide new polymers by olefin polymerization.

This invention contemplates the deposition of an organometallic derivative of titanium alkoxide on a conventional support of a chromium oxide polymerization catalyst. It has been discovered that the interaction of a titanium compound and certain other compounds will produce a reaction product, referred to hereinafter as a "complex," which will affect the quality of the polymerization product. More specifically, the reaction involves the formation of an organometallic derivative of titanium alkoxide by reacting a titanium alkoxide of the general formula $Ti(OR)_4$ with a compound selected from the group consisting of $R'_x Sn(OH)_m$ wherein $m$ and $n$ are integers, $m$ having a value of 1, 2, or 3, and the sum of $x+m=4$; or with a compound selected from the group consisting of $R''_p B(OH)_q$, wherein $p$ and $q$ are integers, $q$ having a value of 1 or 2 and the sum of $p+q=3$, and where R, R', and R'' are independently selected from the group consisting of alkyl, aryl, and cycloalkyl radicals, and combinations thereof such as aralkyl, alkaryl, and the like, each radical having one to 12 carbon atoms. Examples of radicals that can be used are methyl, ethyl, isopropyl, hexyl, dodecyl, cyclohexyl, benzyl, phenyl, tolyl, naphthyl, phenylcyclopentyl, and the like.

Inasmuch as the exact mechanism of the reaction are unknown, and accordingly, the exact formulas of the compounds are unknown, such formulas as are expressed herein are only representative of the materials used in the reaction. The terms "titanium-tin complex," "titanium-boron complex," and "reaction complex" are used to designate the reaction product obtained by the aforementioned reactions.

According to the method of this invention, the invention contemplates the inclusion of the titanium complex in the catalyst to the extent that the titanium content of the finished catalyst is about 1 to about 10 weight percent, and the tin content is about 0.1 to about 5 weight percent, and the boron content is about 0.1 to about 0.9 weight percent.

The titanium complex of either formula is prepared by direct reaction of titanium alkoxide with the tin or boron derivative in an organic medium, and the catalyst support is impregnated with the reaction mixture without isolation of the perturbing compound therefrom. Most organic mediums are satisfactory, a compound of intermediate molecular weight, such as heptane or toluene, being preferred. Due to the decomposition tendencies of certain of the materials involved, the production of the complex is conducted in an anhydrous environment.

Typical titanium-tin complex preparation procedure is that in which about 0.01 mole of titanium isopropoxide and about 0.01 mole of triphenyl tin hydroxide are dissolved in about 100 ml. of anhydrous toluene, the mixture being refluxed one hour (110° C.) to produce a reaction mixture suitable, without isolation of the titanium-tin complex, for impregnation of the catalyst support.

Typical of the titanium-boron complete preparation procedure is that in which about 0.01 mole of titanium isopropoxide and about 0.01 mole of phenyl boron hydroxide are dissolved in 100 ml. of anhydrous toluene, the mixture being refluxed for about one-half hour to produce a reaction mixture suitable, without isolation of the titanium-boron complex, for impregnation of the catalyst support.

Usually the mole ratio of the titanium compound to the boron or tin compound is in the range of 0.1/1 to 10/1, and the reaction temperature is in the range of 50° to 150° C., but mole ratios and temperatures outside these ranges can be used.

The impregnation of the catalyst support whether silica, alumina, zirconia and thoria, or combinations thereof, is usually accomplished by admixing the support with the reaction mixture, refluxing the mixture for about 2 hours, and recovering and drying the catalyst support.

For example, after the above preparations of the "in situ" titanium complexes, about 4 grams of a silica base, of the microspheroidal type, were admixed with the reaction mixture, and admixture being refluxed for about 2 to 3 hours. Thereafter, the silica base was separated from the liquid and dried.

Impregnation of the catalyst base containing the perturbing complex with the chromium-containing material can be done in the usual manner of impregnation using a nonaqueous solvent. For example, in both of the above instances, to the silica base, impregnated with the perturbing complex, was added about 0.078 grams of chromium oxide, $CrO_3$, in an organic solvent such as pyridine or dimethylformamide. The mixture was evaporated to dryness and the catalyst of this invention was recovered. The perturbed catalysts all contained 1 weight percent chromium. Chromium contents of 0.1 to 10 percent can be used.

The perturbed catalysts which are so prepared are employed in conventional polymerization processes in the conventional manner. Such processed include both production of the polymer in the liquid form and in the solid particle form. Generally, the process comprises contacting the olefin, in a hydrocarbon diluent at a temperature in the range of about 150° to 450° F. at a pressure sufficient to maintain the hydrocarbon as a liquid.

In the evaluation of the perturbed catalysts whose preparation was described in the foregoing, the process was conducted to polymerize ethylene in isopentane at 220° F. and 450 p.s.i.g. in 40- to 90-minute runs to produce a particle-form polymer. In each instance, the perturbed catalyst, after preparation, was activated conventionally by heating at temperatures in the range of 1,000° to 1,700° F. for 5 hours.

The perturbed catalysts were compared with catalysts prepared in the same manner, on the same type catalyst support, and activated under similar conditions, containing only added chromium or added chromium and titanium: impregnated

TABLE I

| Run No. | Perturbing agent complex | Weight percent titanium in catalyst | Weight percent companion metal in catalyst | Catalyst activation temp., °F. | Productivity, lbs. polymer/ lbs. catalyst | Length of run, minutes | Polymer product (c) | | |
|---|---|---|---|---|---|---|---|---|---|
| | | | | | | | MI | HLMI | HLMI/MI |
| 1 | None | None | None | 1,000 | 2,480 | 60 | 0.05 | 2.5 | |
| 2 | do | None | None | 1,300 | 4,060 | 70 | 0.090 | 7.1 | 82 |
| 3 | do | None | None | 1,500 | 4,900 | 70 | 0.15 | 12.0 | 79 |
| 4 | do | None | None | 1,600 | 5,580 | 75 | 0.20 | 17.3 | 87 |
| 5 | do | None | None | 1,700 | 2,800 | 55 | 0.25 | 21.2 | 85 |
| 6 | do | a 5 | None | 1,000 | 1,540 | 40 | 0.08 | 10.7 | 133 |
| 7 | Ti(i-PrO)₄+Ph₂B(OH)₂ b | 5.0 | 1.0 | 1,000 | None | | | | |
| 8 | Same as above b | 5.0 | 1.0 | 1,200 | None | | | | |
| 9 | do b | 6.0 | 0.56 | 1,200 | 2,460 | 90 | 0.40 | 25.2 | 63 |
| 10 | do b | 6.0 | 0.56 | 1,000 | 2,310 | 90 | 0.24 | 19.2 | 81 |
| 11 | Ti(i-PrO)₄+Ph₃SnOH b | 4.8 | 4.2 | 1,500 | 2,960 | 70 | 0.75 | 53.0 | 71 |
| 12 | Same as above b | 4.8 | 4.2 | 1,600 | 2,950 | 80 | 0.45 | 40.8 | 90 |
| 13 | do | 4.8 | 4.2 | 1,300 | 2,050 | 90 | 0.54 | 38.2 | 71 |
| 14 | Ti(i-PrO)₄+(CH₃)₃SnOH b | 5.0 | 9.0 | 1,500 | 2,610 | 80 | 0.42 | 31.9 | 74 |
| 15 | Same as above b | 5.0 | 10.0 | 1,600 | 2,680 | 65 | 0.37 | 32.2 | 87 | a Added by refluxing support with titanium isopropoxide in anhydrous toluene for about 2 hours.
b Reaction product of the two indicated compounds formed by refluxing in anhydrous toluene for about 30 minutes.
c Melt index determined by ASTM D 1238–62T; Condition E for MI and Condition F for HLMI.

Runs 1 through 5 indicate operation of the polymerization process in the absence of the additives of this invention and generally indicate the production of low-melt index polymer.

Run 6 was made with the conventional catalyst system of runs 1 through 5 to which had been added the titanium only in the form of titanium isoporpoxide. Within the same activation temperature range as employed for that catalyst used in runs 1 through 5, there is no significant change shown in the melt index of the polymer produced, thus indicating that the titanium isopropoxide is, of itself, ineffectual.

Runs 9 and 10 indicate the operability of the catalyst of this invention, the catalyst system containing a titanium-borate complex formed by the interreaction of titanium isopropoxide with phenyl boron hydroxide in the presence of toluene. These data indicate a significant increase in the melt index of the polymer produced with the catalyst of this invention, even when activated at relatively low temperature. "Runs 7 and 8 show that by using an amount of boron above 0.9 weight percent, no polymer is obtained".

Runs 11 through 15 indicate the operability of the catalyst of this invention, the catalyst system containing a titanium-tin complex formed by the interreaction of titanium isopropoxide with triphenyl or trimethyl tin hydroxide is the presence of toluene. These data indicate a significant increase in the melt index of polymer produced with the catalyst of this invention.

While the above data are limited to titanium-tin and titanium-boron complexes, it has been found that other metals, coupled with titanium in analogous complexes, are also effectual. These metals include gallium, zirconium, tantalum, niobium, indium, germanium, aluminum, silicon, lanthanum, and yttrium. The complexes including these metals with titanium are prepared and employed in the manner described.

It will be evident that certain modifications can be made in regard to the method of this invention. However, such are considered to be within the scope of this invention.

What is claimed is:

1. A method of preparing an olefin polymerization catalyst which comprises:
   a. reacting a titanium alkoxide of the general formula Ti(OR)₄ with a compound selected from the group consisting of (1) R'$_x$ Sn(OH)$_m$ and (2) R''$_p$ B(OH)$_q$ to form a titanium complex, wherein R, R', and R'' are independently selected from the group consisting of alkyl, aryl, and cycloalkyl radicals and combinations thereof, and in (1) $m$ and $x$ being integers, $m$ having a value of 1 to 3, inclusive, the sum of $x$ and $m$ being 4, and in (2) $p$ and $q$ being integers, $q$ having a value of 1 to 2, inclusive, the sum of $p$ and $q$ being 3;
   b. impregnating a catalyst support selected from the group consisting of silica, alumina, zirconia, and thoria with said titanium complex; and,
   c. depositing chromium oxide on the titanium complex-impregnated catalyst support to form said catalyst, said catalyst support being impregnated with said titanium complex in an amount sufficient to provide a titanium content in said catalyst of an amount within the range of about 1 to about 10 weight percent, a tin content of an amount within the range of about 0.1 to about 5 weight percent of said catalyst, or a boron content of an amount of about 0.1 to about 0.9 weight percent of said catalyst, said chromium being present in said catalyst in an amount within the range of from about 0.1 to about 10 weight percent.

2. The method of claim 1 wherein the titanium complex is formed in the presence of an organic medium.

3. The method of claim 1 wherein the titanium complex is contained in the polymerization catalyst from about 1 to about 10 weight percent of the weight of the catalyst.

4. The method of claim 1 wherein the titanium complex contains the titanium compound and the boron compound is molal ratios of about 0.1/1 to about 10/1.

5. The method of claim 1 wherein the titanium complex contains the titanium compound and the tin compound in molal ratios of about 0.1/1 to about 10/1.

6. The method of claim 1 wherein the catalyst support is impregnated with the titanium reaction product by introducing the support into the hydrocarbon medium in which the titanium reaction product is formed.

7. The method of claim 6 wherein the impregnation is carried out by refluxing the titanium reaction product and the catalyst support in the hydrocarbon medium in which the titanium reaction product is formed.

8. The method of claim 7 in which chromium oxide in an organic solvent is introduced in contact with the catalyst support impregnated with the titanium reaction product and the mixture evaporated to dryness and the catalyst recovered.

9. The method of claim 1 wherein titanium isopropoxide is contacted with triphenyl tin hydroxide in equi-mol proportions in anhydrous toluene, the catalyst support is introduced into the toluene containing the titanium-tin complex, said support being thereby impregnated with said complex, the impregnated support being separated from the toluene and impregnated with chromium oxide.

10. The method of claim 1 wherein titanium isopropoxide is contacted with diphenyl boron hydroxide in equi-mol proportions in anhydrous toluene, the catalyst support is introduced into the toluene containing the boron-tin complex, said support being thereby impregnated with said complex, the impregnated support being separated from the toluene and impregnated with chromium oxide.

* * * * *